United States Patent [19]
Weber et al.

[11] 3,887,470
[45] June 3, 1975

[54] WASTE REMOVAL SYSTEM

[75] Inventors: Roland E. Weber, Holyoke; Carl J. Zimmermann, Belchertown, both of Mass.

[73] Assignee: Industrial Pollution Control Corp., Ware, Mass.

[22] Filed: Oct. 31, 1973

[21] Appl. No.: 411,247

[52] U.S. Cl. ............... 210/261; 100/117; 100/146; 100/186; 210/262; 210/414
[51] Int. Cl. .......................................... B01d 25/38
[58] Field of Search ............ 100/116, 117, 145–150, 100/186, 188, 209, 218, 289; 210/256, 332, 359, 407, 413–415, 261, 262; 222/275, 361, 386

[56] References Cited
UNITED STATES PATENTS

| | | | |
|---|---|---|---|
| 478,539 | 7/1892 | Goodhue | 100/186 X |
| 2,893,609 | 7/1959 | Spiess, Jr. et al. | 222/361 X |
| 2,971,456 | 2/1961 | Thomas | 100/186 X |
| 3,055,290 | 9/1962 | Arvanitakis | 210/407 X |
| 3,115,458 | 12/1963 | Bebech | 210/332 X |
| 3,698,558 | 10/1972 | Weber et al. | 210/256 |
| 3,796,316 | 3/1974 | Matz | 210/332 |

Primary Examiner—Samih N. Zaharna
Assistant Examiner—Robert H. Spitzer
Attorney, Agent, or Firm—Ross, Ross & Flavin

[57] ABSTRACT

An anti-pollution device for separating a liquid and solid fractions of an effluent within a tank means and collecting and compacting the solid fraction and transporting the fraction to a residue receptacle.

1 Claim, 6 Drawing Figures

WASTE REMOVAL SYSTEM

The invention envisions an anti-pollution apparatus incorporating a tank means inclusive of an upper work area where a mainly liquid fraction is separated from a mainly heavier solids fraction with the liquid fraction flowing outwardly of the upper area and with the solids fraction falling downwardly into a lower work area and thence through a compacting means to a residue receptacle.

In our own earlier patent, U.S. Pat. No. 3,698,558 of Oct. 17, 1972, the upper area of the tank was arranged so that any floating particles would rise and flow off into a strategically-located receptacle and the liquid would pass along a series of helicoid ribs, with the heavier particles falling into the tank lower area. Inlet and outlet openings through the tank side wall led into and from the upper area and an assembly disposed below the tank was for purposes of collecting and packing and removing the separated heavier particles.

As aforesaid, the present invention is directed to an improved waste removal assembly as applied to earlier U.S. Pat. No. 3,698,558 and as a self-contained unit for waste disposal in the case of such as the backwash residue found in existing sand filter beds as used in the paper industry.

The apparatus offers advantages over prior art constructions in that:

1. it allows for fluctuations in the composition of the contaminates, especially allowing for operational speed-up to accommodate any residue increase in the liquid;
2. it allows for capacity variations;
3. it compacts to various degrees of dehydration;
4. it provides a continuous sedimentation process;
5. it minimizes turbulence to prevent contaminates from recirculating;
6. it provides, by means of the configuration of the chamber, a method of compacting by resolution of indirect forces;
7. it allows for means to compact certain contaminates which cannot be compacted in any other manner by virtue of an angular ram and the method of transmitting the ram by slow turning screws;
8. it provides, by means of rotating compartmented receptacles, continuous removal of residue with minimal interruption with the compacting operation.

In general principle, the apparatus provides a means for compacting, dehydrating and removing solids from the sump of a liquid filter or settling tank.

Figure 1:
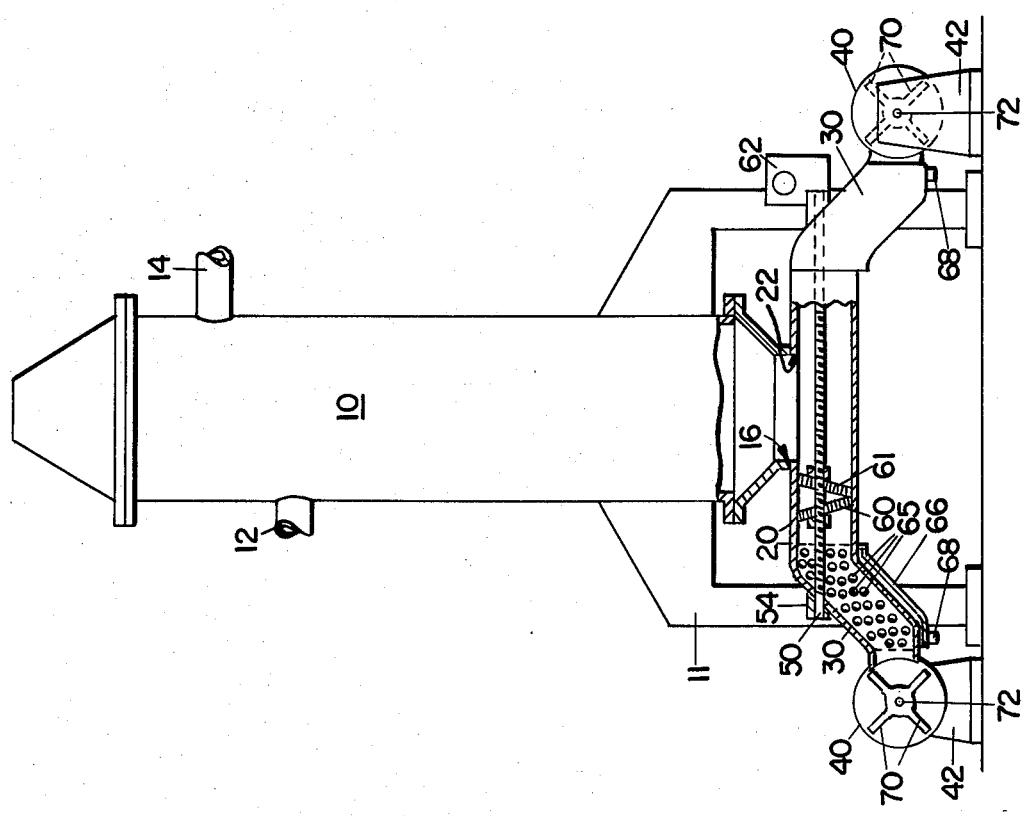
FIG. 1 is a view, in side elevation, of the apparatus with certain key components shown in section.
Figure 2:
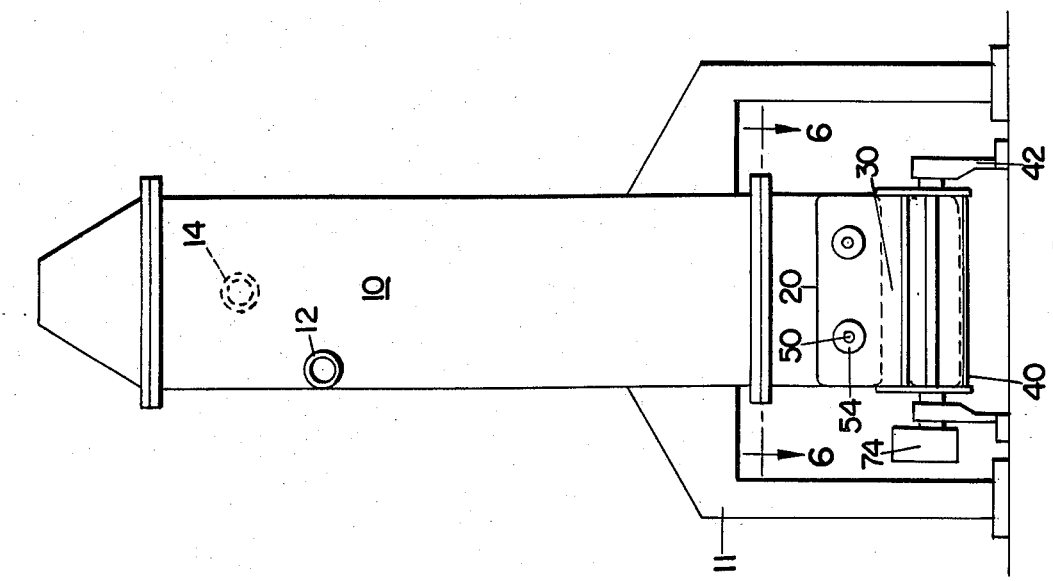
FIG. 2 is a view, in end elevation, of the FIG. 1 apparatus.
Figure 3:
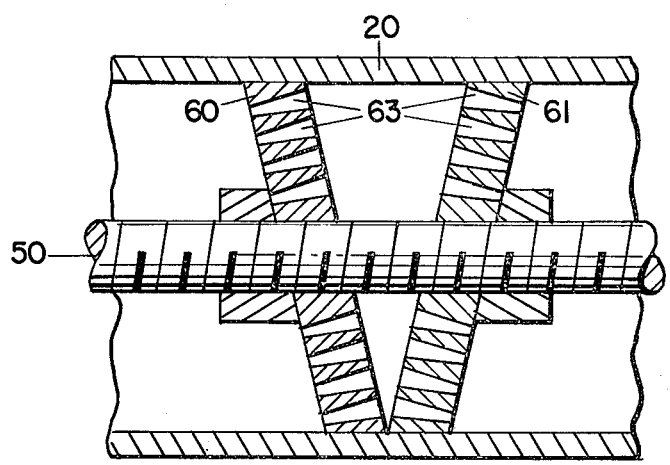
FIG. 3 is an enlarged fragmentary view in section showing the housing, ram and one of the screws with nuts.

The assemblage is disposed below and in communication with such as a vertically-extending tank or sump 10 serving as a liquid filter or settling tank supported upwardly by strategically-positioned standards 11 and including a fluid inlet 12 and fluid outlet 14 in its side wall.

An elongated, horizontally-extending housing 20, rectangular in its cross sectional configuration, is suitably disposed relative to and below tank 10 with a central opening 22 through its upper planar surface being in direct alignment and communication with the tank lower mouth 16 for purposes of receiving therefrom such solids or other wastes as may be vertically charged or dumped therefrom.

Housing 20 is open at each opposite end for direct connection to (or it may be integral with) the upper horizontally-disposed end portion of an adjacently-disposed suitably-dimensioned inclined dehydrating chamber 30, which dehydrating chamber has an opposite lower horizontally-disposed end portion connected to a respective compartmented residue receptacle 40 suitably mounted on a stand 42.

Extendable longitudinally and centrally within housing 20 are a pair of spaced parallel drive screws 50 appropriately journalled at opposite ends in respective bearings 52 seated in bosses 54 in the walls of the dehydrating chambers 30.

A generally Vee-shaped ram, composed of a pair of angularly and oppositely disposed left hand and right hand ram heads 60 and 61 respectively, is in threaded engagement with drive screws 50, each of which ram heads members wipes the inner surfaces of the adjacent confronting housing walls.

Operationally, the ram is in seriatim motivated along and relative to the drive screws from end to end accordingly as the drive screws are rotated unisonly via a suitable selective control means within a prime mover 62 operatively connected through conventional gearing within a gear box 64. That is, the direction of movement of the ram is preferentially alternated in a single cycle in the respect that the ram is first driven to one outboard end of the housing and is next driven to the opposite outboard end thereby forcing in each such separate movement the compaction of the solids dumped into the housing and the passage of the compacted mass according to the direction of ram movement from within the housing into the respective dehydrating chamber at the terminus of the housing passage and the further movement of the dehydrated mass therefrom into a compartment of the residue receptacle.

And as the ram is compacting toward and into the dehydrating chamber at one terminus of the housing passage, that portion of the housing passage rearwardly of the ram is being simultaneously recharged with another quota of solids for a next subsequent compaction.

As the dimensions of the first-to-be charged housing passage gradually decrease during the first compaction program, the dimensions of the second-to-be-charged housing passage gradually increase until the ram commences reciprocation in retrograde movement toward cycle completion, wherefollowing the next succeeding cycle is initiated and progresses in identical manner.

Figure 4:
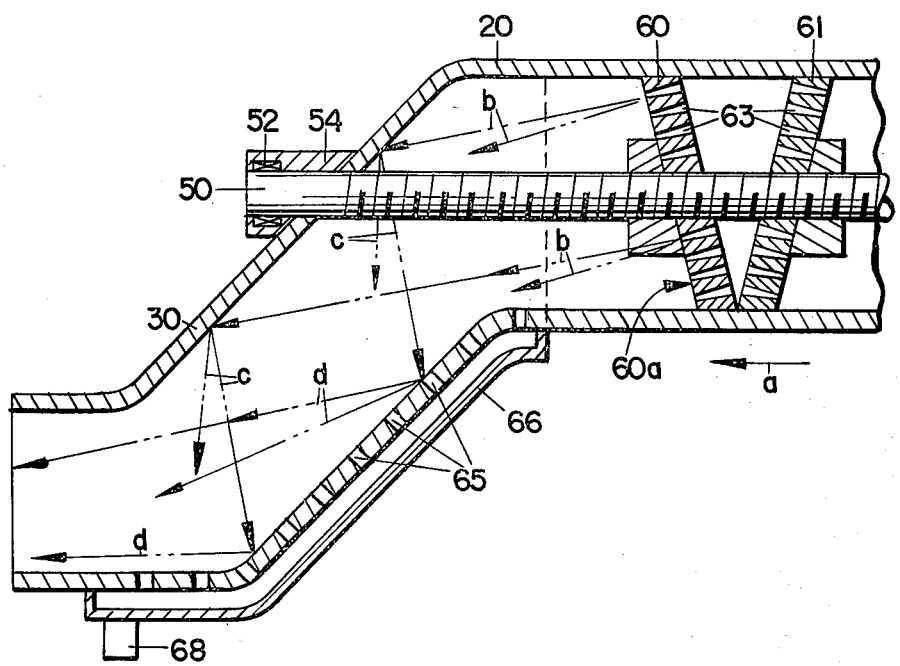
FIG. 4 is an enlarged fragmentary view in section showing the housing, one of the connecting dehydrating chambers, ram and one of the screws with nuts.
Figure 5:
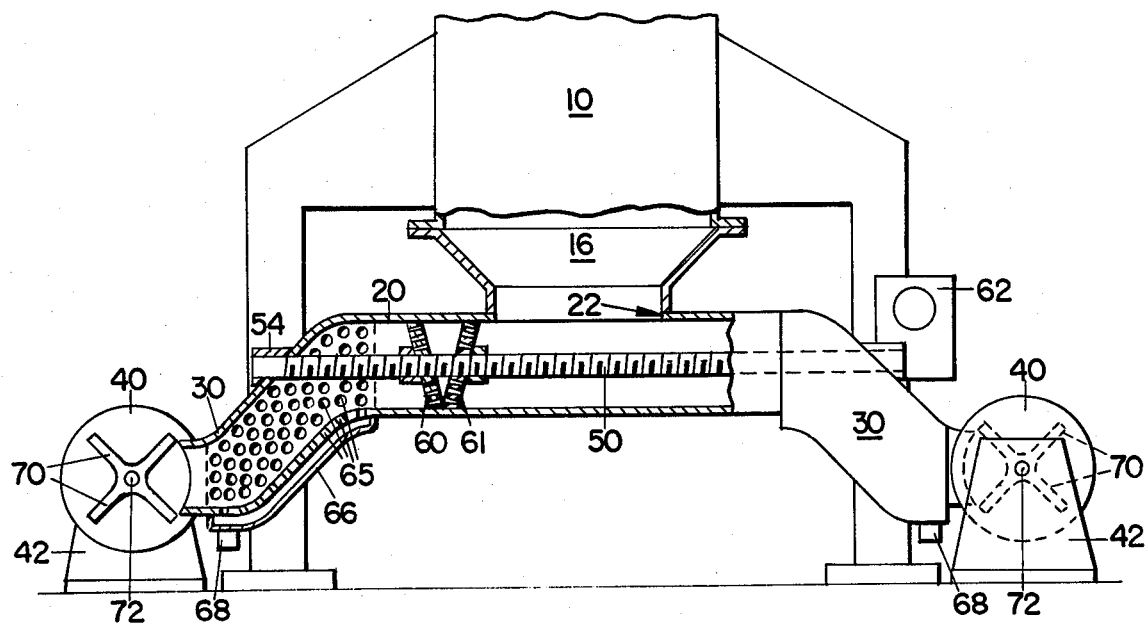
FIG. 5 is a fragmentary view, in side elevation as in FIG. 1, showing certain components, some in section, on an enlarged scale.
Figure 6:
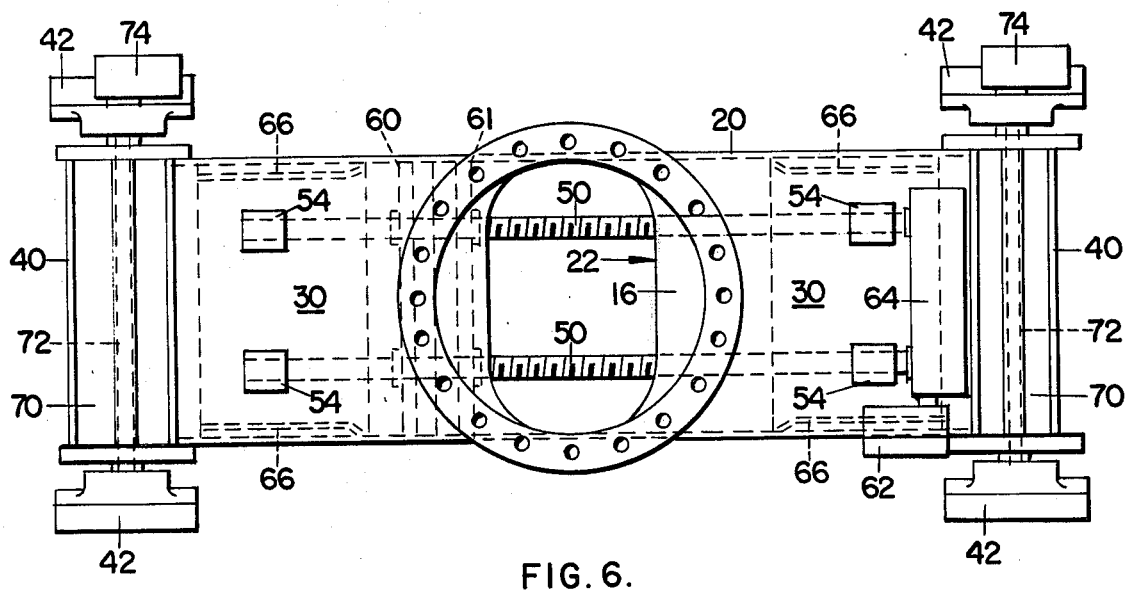
FIG. 6 is an enlarged sectional view on line 6—6 of FIG. 2.

Left hand and right hand ram heads 60 and 61 respectively are each canted so that the respective forwardly-facing or outboard compacting or working face of each (e.g., face 60a of left hand ram head 60 when the ram is moving in the direction *a* as shown in FIG. 4) is the face which works against the waste mass being compacted at that moment and the left hand ram head is the ram head which exerts a direct pressure upon that waste mass, that pressure being represented by force lines denoted by arrows *b* showing the forces as being directed forwardly (or to the left) as well as downwardly (or to the bottom) so as to create a forcement of the waste downwardly into dehydrating chamber 30 with the inclination of the wall thereof inducing the waste further forwardly and downwardly as denoted by the arrows *c* and further forwardly and downwardly as denoted by the arrows *d* as it is pushed through and into the horizontally-extending end portion at the lower end of the dehydrating chamber.

Ram heads 60 and 61 of the ram are each apertured with tapered openings 63 therethrough, the openings in each case being smaller on the outboard compacting face than on the inboard non-compacting face to the end that, as the ram is motivated in compacting direction, say to the left as viewed in FIG. 4, fluid expressed from the waste mass is allowed to pass rearwardly through the openings of ram head 60 without the danger of those openings becoming plugged and thence easily outwardly through the openings of opposite ram head 61, said latter ram head being in continuous movement away from the next-to-be-compacted charge and eventually into the liquid discharge jacket 66 now to be described.

The side and bottom walls of each dehydrating chamber 30 are preferentially apertured with a plurality of openings 65 to allow the release of expressed fluid material therefrom into an encapsulating liquid discharge jacket 66 and discharge therefrom via a connecting drain 68.

The outboard lower terminus of each dehydrating chamber 30 communicates with a vertically-disposed generally cylindrical drum shaped residue receptacle 40 in which is disposed a segmenting means comprising a series of radially-extending walls 70 mounted upon a horizontally-extending axle 72 and rotated by a motor or motors 74.

Adjacent walls 70 cooperantly define Vee-shaped residue receptacle segments into which the compacted waste is in seriatim charged.

As a residue receptacle segment is filled or at a predetermined intermittent interval, the segmenting means is rotated in the appropriate number of degrees for the charging of the next-following residue receptacle segment and the simultaneous dumping of the first charged segment.

We claim:

1. In anti-pollution apparatus incorporating a settling tank inclusive of an upper work area where a mainly liquid fraction is separated from a mainly heavier solid fraction with the liquid fraction being charged outwardly of the upper area and a lower work area where the solid fraction is charged downwardly thereinto from the upper work area and a lowermost discharge opening leading from the lower work area, the improvement in means for the compacting of the solid fraction and the expression of fluent material therefrom comprising:

a horizontally-extending housing having a hollow interior of rectangular configuration in cross section and an uppermost central receiving opening in direct communication with the lowermost discharge opening of the settling tank and having an outlet at each opposite outboard extremity, a pair of spaced parallel drive screws journalled at opposite ends of the housing and being extendable through and centrally of the housing interior, a pair of angularly-and-oppositely-disposed compacting ram heads in threaded engagement with the drive screws for reciprocation in alternating in seriatim compacting strokes between the opposite outlets of the housing, each compacting ram head having an outboard compacting face and an inboard non-compacting face and a plurality of tapered passages therethrough with each passage being smaller on the outboard compacting face than on the inboard non-compacting face, drive means for unisonly driving the drive screws in a manner for effecting the in seriatim compacting movements of the compacting ram heads, an adjacently-disposed dehydrating chamber having upper open and lower open ends and being positioned at each end of the housing communicating at its upper open end with and inclining vertically below and away from the respective outlet for receiving a compacted charge of the solid fraction from within the housing during and upon the completion of each respective compacting stroke of the respective compacting ram head, inclined drum-shaped release means for the removal of fluent material expressed from each compacted charge of the solid fraction charged into each dehydrating chamber, a horizontally-disposed drum-shaped residue receptacle communicating with the lower open end of each dehydrating chamber, means within said receptacle for the intermittent collection and removal of the charges of the solid fraction charged thereinto from the housing and respective dehydrating chamber and being rotated for the in seriatim dumping of a compacted charge of the solid fraction from one compartment while a next-following compartment is being charged.

* * * * *